(12) United States Patent
Axelrod

(10) Patent No.: US 7,504,176 B2
(45) Date of Patent: Mar. 17, 2009

(54) CAPTURING MECHANISM WITH A FLEXIBLE TONGUE HAVING GUIDETABS COMPRISING HOOKS

(75) Inventor: Michael Axelrod, Roswell, GA (US)

(73) Assignee: Arris International, Inc., Suwanee, GA (US)

( * ) Notice: Subject to any disclaimer, the term of this patent is extended or adjusted under 35 U.S.C. 154(b) by 1155 days.

(21) Appl. No.: 10/889,560

(22) Filed: Jul. 12, 2004

(65) Prior Publication Data

US 2005/0008931 A1 Jan. 13, 2005

Related U.S. Application Data

(60) Provisional application No. 60/486,506, filed on Jul. 11, 2003.

(51) Int. Cl.
*H01M 2/06* (2006.01)
(52) U.S. Cl. .................. 429/96; 429/97; 361/814; 439/180
(58) Field of Classification Search ............. 429/96–97; 361/814
See application file for complete search history.

(56) References Cited

U.S. PATENT DOCUMENTS

| 5,453,912 | A | * | 9/1995 | Lytle et al. ................. 361/814 |
| 5,792,573 | A | * | 8/1998 | Pitzen et al. ................ 429/97 |
| 5,933,330 | A | * | 8/1999 | Beutler et al. .............. 361/814 |
| 6,142,802 | A | * | 11/2000 | Berg et al. ................. 439/180 |

* cited by examiner

*Primary Examiner*—Mark Ruthkosky
(74) *Attorney, Agent, or Firm*—John L. Doughty

(57) ABSTRACT

A flexible tongue having guide tabs is used in a battery capturing mechanism to engage alignment grooves formed in a battery cartridge. The guide tabs form hooks so that when the battery has been inserted, thereby causing the tongues to deflect at a flexible hinge as the battery slides into the capturing mechanism, the hooks retain the battery. Preferably tapered guide rails are aligned with the tabs and are formed on a rigid floor to which the tongue's flexible hinge attaches, thereby guiding a connector of the battery into electrical engagement with a corresponding connector that is part of the device into which the battery capturing mechanism is used. To remove the battery, the tongue may be depressed and battery grips grasped to retrieve the battery from the mechanism.

10 Claims, 4 Drawing Sheets

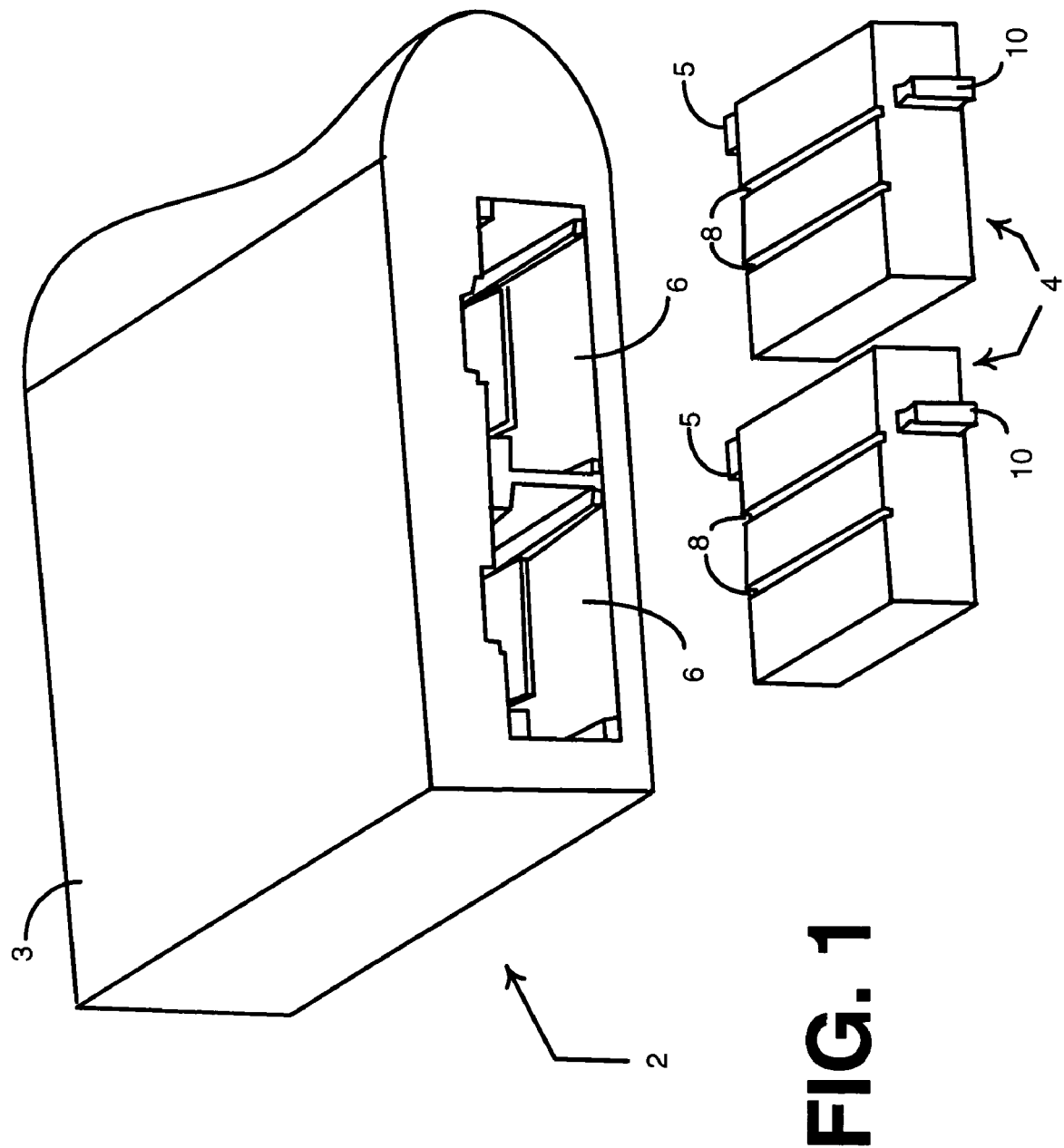

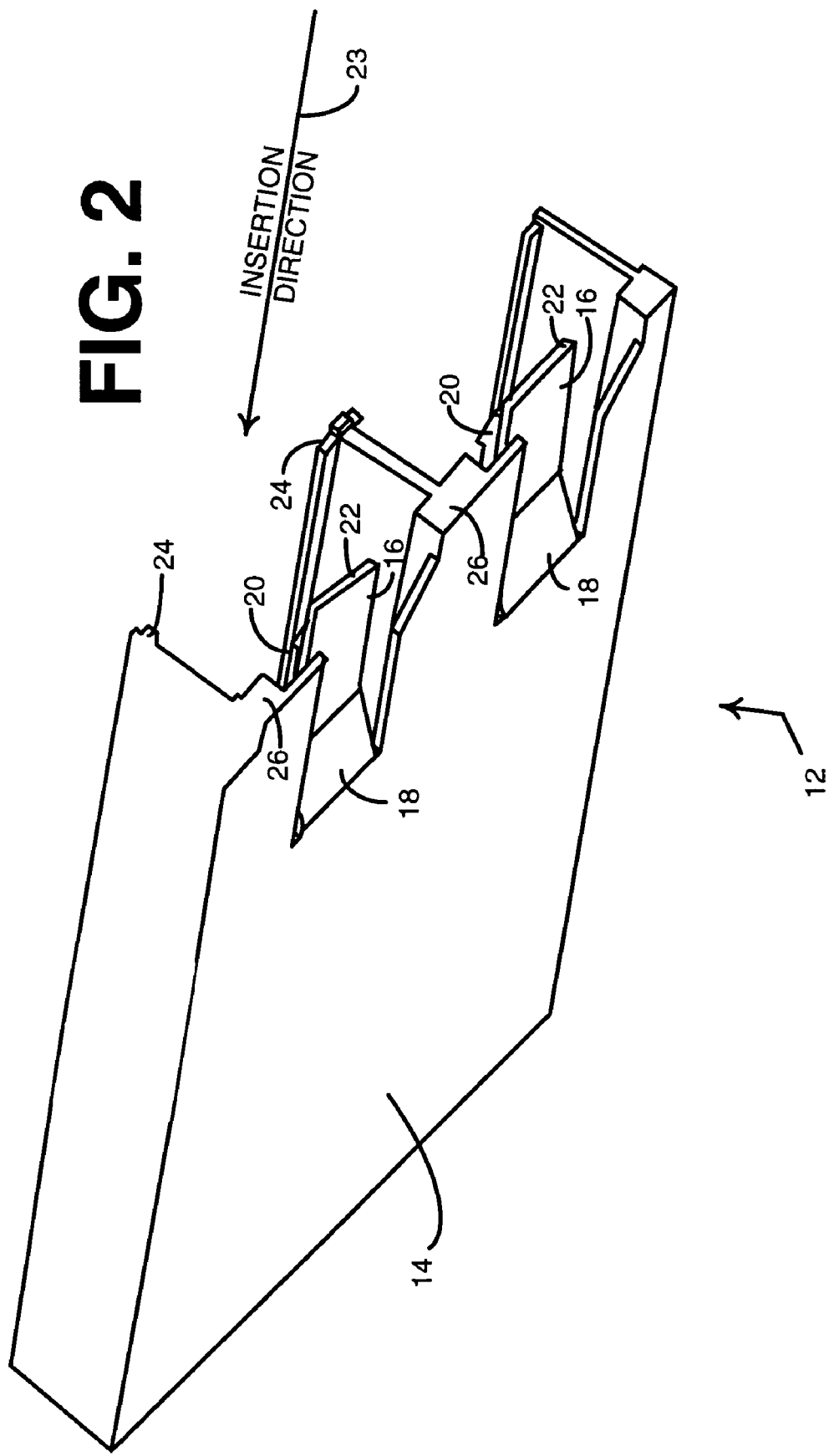

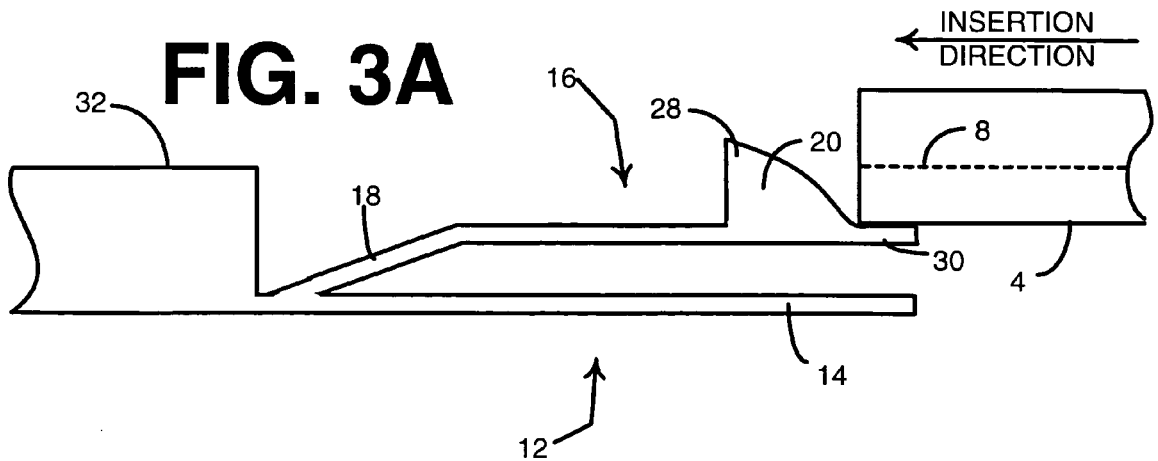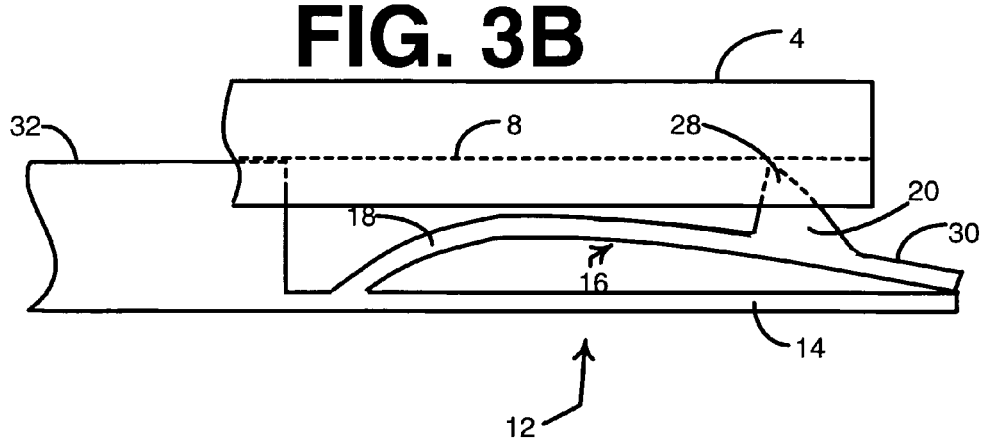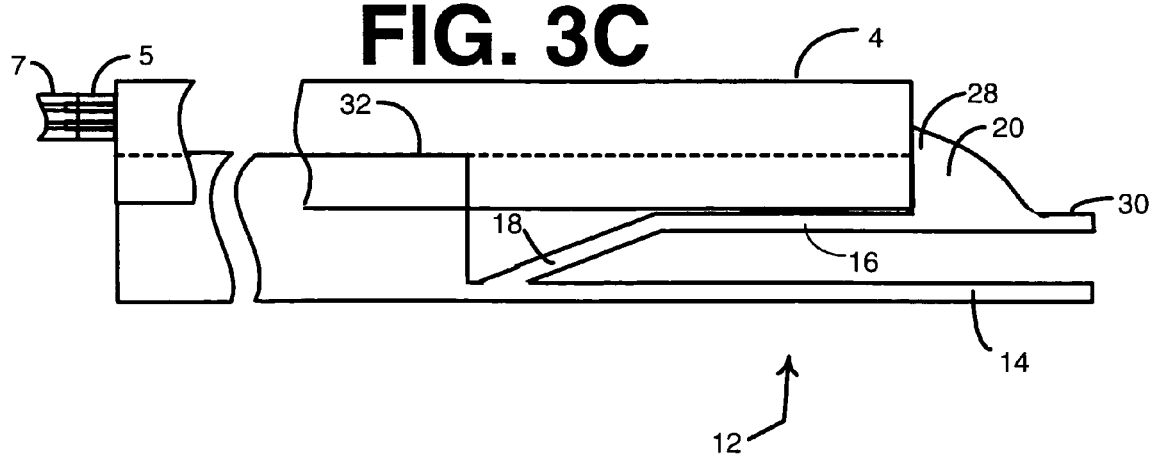

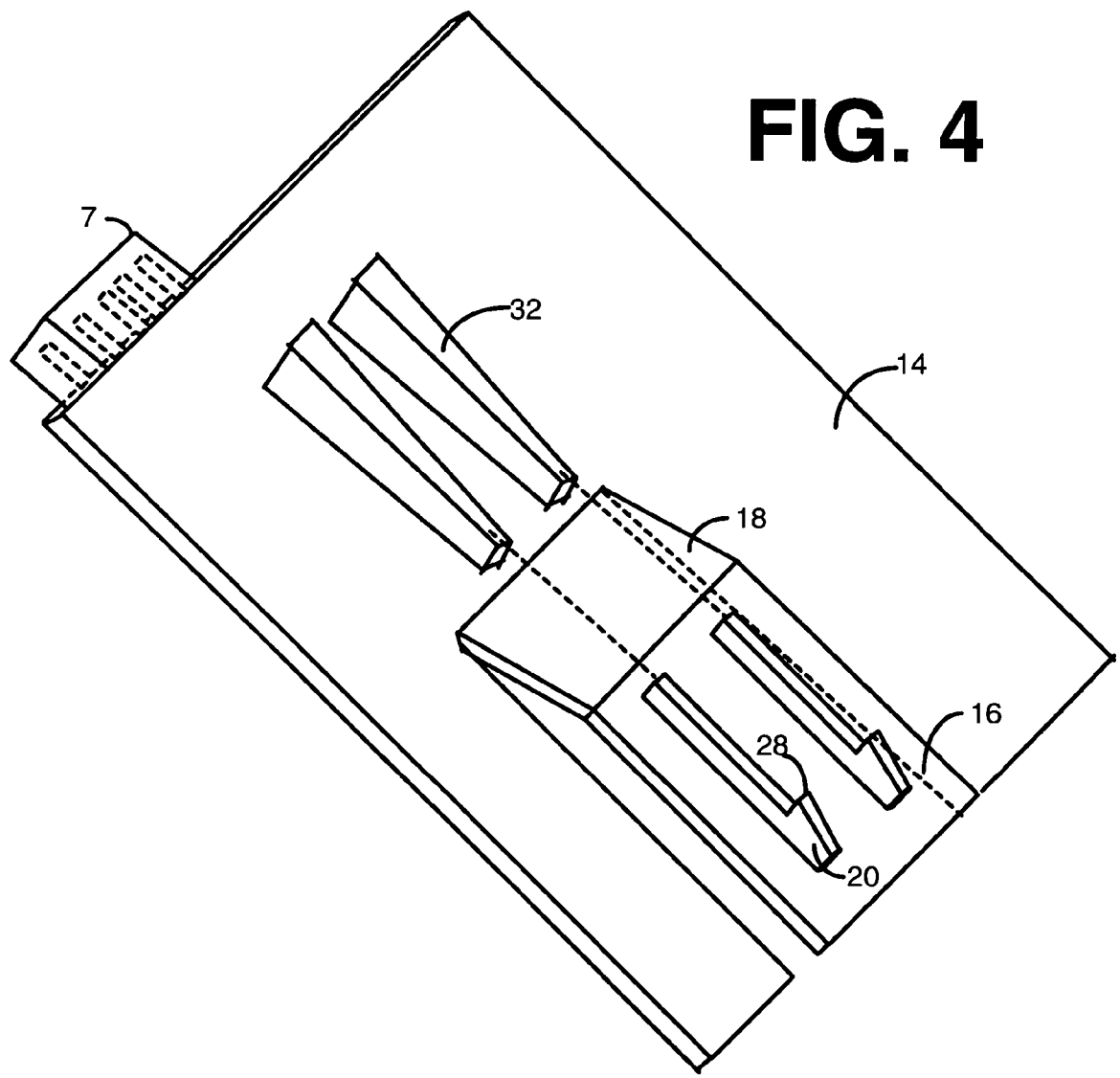

CAPTURING MECHANISM WITH A FLEXIBLE TONGUE HAVING GUIDETABS COMPRISING HOOKS

CROSS REFERENCE TO RELATED APPLICATION

This application claims the benefit of priority under 35 U.S.C. 119(e) to the filing date of Axelrod, U.S. provisional patent application No. 60/486,506 entitled "Li-Ion Battery Pack Capturing Mechanism", which was filed Jul. 11, 2003, and is incorporated herein by reference in its entirety.

FIELD OF THE INVENTION

The present invention relates generally to broadband communication network devices, and more particularly to a mechanism for receiving and retaining a battery pack into an electronic device.

BACKGROUND

Community antenna television ("CATV") networks have been used for more then four decades to deliver television programming to a large number of subscribers. Increasingly, CATV networks are used by providers to provide data services to subscribers. For example, cable modems used in a broadband cable modem termination system ("CMTS") compete with digital subscriber lines ("DSL") and DSL modems used therein, which are typically implemented and supported by telephone companies. DSL service is typically provided over the same wires as a residence's telephone service.

Cable modems, on the other hand, use the CATV cabling over which CATV programming is provided. Some cable television and cable data providers compete with telephone companies by offering telephony services over the CATV network using Internet protocol. This is known in the art as 'voice over IP' ("VoIP").

Conventional telephony networks provide electrical current from a central location to a user's telephony equipment for dial tone and off-hook signaling, for example. The power supplied from the telephone company's central location is provided from a utility company's power lines at the central office location under normal conditions, and is typically supplemented by a diesel generator in case off site power from the power company is interrupted. Thus, power for telephony service is always available; in an emergency, the local 911 operator can always be reached.

Although a CATV network often supplies some AC power for network devices, a subscriber's device or devices are typically powered by household AC current. Since most consumers do not have a diesel generator to back up off-site power supplied by a local utility company, batteries are typically used to provide a backup in case off-site power is lost. This allows a VoIP-over-CATV subscriber to place a telephone call during a power outage, including placing a call to a 911 operator in case an emergency situation requires contacting police, fire, paramedic, or medical personnel.

To increase reliability and reduce physical size, cable modem and other devices that support VoIP-over-CATV do not use the standard dry-cell batteries widely known to consumers in the familiar AAA, AA, C, D and 9-volt configurations. This is because rechargeable batteries are used so that immediately following a power outage, reasonable assurances are provided that the batteries will be operative. While power is being supplied from an off-site utility company, charge on the back-up batteries is being maintained or recharged. However, to maintain quality control and to facilitate particular size and shapes of devices, proprietary battery packs, preferably lithium ion, are provided by equipment manufactures to cable operators.

Although CATV equipment manufacturers typically try to design their products to be better than their competitors, a winning business strategy is based on the premise that the customer is always right and the customer comes first, as it is in other industries. Since cable operators, which are the customers of equipment manufacturers, typically stock these batteries and provide them to technicians who make service calls for equipment installation and/or maintenance, and provide batteries to customers who request replacement batteries, it is desirable to stock as few different types and styles of batteries as possible.

Accordingly, cable operators, who often incorporate equipment from more than one manufacturer, have requested that industry manufacturers agree to a design for battery cartridges that is interchangeable across a variety of devices from a variety of manufacturers. Thus, an operator would only have to stock a single type of battery. This would be advantageous because storing multiple batteries for multiple devices, among other things, requires more storage space, may result in the likelihood that certain batteries for products that are not widely used will loose the ability to retain charge after long storage periods and result in an increased likelihood that the wrong battery type may be provided for a given product.

Obviously, when different manufacturers market similar products, or similar particular aspects of competing products, they will seek to distinguish these competing products from one another. Thus, there is a need in the art to distinguish aspects related to the interchangeable battery, and its related device interface, among manufacturers. In addition to distinguishing the battery-related aspects among manufacturers, it is also desirable to provide a mechanism that facilitates installation and removal of a battery cartridge from a device.

BRIEF DESCRIPTION OF THE DRAWINGS

FIG. 1 illustrates a perspective view of a cable modem and two battery cartridges for insertion into capturing mechanisms therein.

FIG. 2 illustrates a perspective view of a capturing mechanism for receiving a battery cartridge.

FIG. 3A illustrates an elevation view of the side of a flexible tongue used in a capturing mechanism before a battery is inserted into it.

FIG. 3B illustrates an elevation view of the side of a flexible tongue as a battery is being inserted.

FIG. 3C illustrates an elevation view of the side of a flexible tongue after a battery has been inserted and captured.

FIG. 4 illustrates a perspective view of the top of the capturing mechanism including the flexible tongue and tapered guide rails.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. This disclosure is not intended nor is to be construed to limit the present invention or otherwise to exclude other embodiments, adaptations, variations, modifications and equivalent arrangements, the present invention being limited only by the claims appended hereto and the equivalents thereof.

Turning now to the figures, FIG. 1 illustrates a perspective view of a cable modem 2 having housing 3 that uses two rechargeable battery cartridges 4 for electric power backup. Batteries 4 having electrical connectors 5 are inserted into cavities 6, inside which are electrical connectors 7 (shown in FIGS. 3C and 4) that slidingly engage with the corresponding connectors 5 on the end of the battery cartridges to provide an electrical coupling between the battery and the device's electrical connector 7. Connectors 5 and corresponding connectors for which the batteries provide backup power are generally shown Batteries 4 define grooves 8 into a top for engagement with tabs and rails, which are shown in subsequent figures, to assist in aligning the electrical connector of the battery to the device 2. Grips 10 facilitate grasping batteries 6 with fingers for pulling out of the modem device 2.

Turning now to FIG. 2, a two-bay mechanism 12 for capturing two battery cartridges is shown. It will be appreciated that mechanism 12 can also be configured for more or less than two batteries. Mechanism 12 comprises floor 14. Floor 14 defines tongue 16 which is attached to the floor with stiff, but flexible, spring hinge 18. Spring hinge 18 and tongue 16 are preferably formed as continuing from floor 14 from a material, preferably plastic, having elastic properties that allow hinge 18 to bend but not break. Thus, hinge 18, tongue 16 and floor 14 may be molded from plastic known in the art such that they are part of a continuous, one-piece-molding product. To engage the parallel battery groves 8, shown in FIG. 1, guide tabs 20 project from tongue 16. As a battery is inserted into a receiving end of mechanism 12, the leading edge 22 of tongue 16 interferes with the leading face of the battery. However, Tongue 16 is angled, downward and to the right as viewed in the figure, such that insertion into mechanism 12 of the battery causes tongue 16 to deflect as the battery is inserted. When the battery is fully inserted into mechanism 12, hooks that are formed into tab 20 maintain the battery into the mechanism such that the electrical connection between the battery and the device being backed-up thereby is maintained.

In addition to tabs 20, bounding rails at each cross-sectional corner—looking into the chamber from the right side as viewed in the figure—are parallel to the battery-insertion direction arrow 23 and locate the battery as it is inserted and when it is secured. Top bounding rails 24 prevent migration of the battery away from tongue 16 and provide resistance to the spring force exerted by the deflected tongue. It will be appreciated that opposition to this spring force need not be in the form of rails, as the top of the chamber of mechanism 12 could form a four-sided enclosure and bear directly against the top of the battery.

In addition to rails 24, rails 26 also guide the battery as it is inserted in mechanism 12. The surface of rail 26 that is parallel to floor 14 will typically be located at an elevation away from and with respect to floor 14 a distance that is less than the elevation from the floor of the highest point of tab 20 with respect to the floor. Thus, as a battery is inserted into mechanism 12, spring force is exerted on the bottom of the inserted battery by the tabs 20, or tongue 16 itself if the depth of grooves 8 as shown in FIG. 1 are deeper than the elevation extent of the tabs away from the upper surface (toward the tab) of the tongue.

Turning now to FIG. 3A, an elevation view of tongue 16 is shown before battery 4 is inserted into mechanism 12, which is guided by engagement of groove 8 with tab 20. Tongue 16 is attached to floor 14 through spring hinge 18, all three components preferable being molded from a single piece of material and having the same thickness. However, these components may comprise varying thickness to facilitate, for example, a stiffer or softer spring constant of hinge 18. The hooks 28 of tab 20 are shown extending above top surface 30 a given distance with hinge 18 in the unsprung position. FIG. 3B shows tongue 16 in the sprung position as battery 4 is being inserted. Hook tips 28 presses against the trough of groove 8 as the battery slides in, the pressure resulting from the spring hinge 18 being bent while the battery is in this intermediate position. FIG. 3C shows the battery 4 after it has been inserted and captured by mechanism 12. Tabs 20 engage groove 8 shown by the broken lines, with hook tip 28 extending above the extent of groove 8 with respect to floor 14, thus, retaining battery 4. To retrieve battery 4 from the device into which it is inserted, the top surface 30 may be depressed away from the battery, thereby bending hinge 18 and allowing the extent of tip 28 to drop below trough of groove 8, thereby permitting retrieval in the direction opposite the insertion direction shown in FIG. 3A.

Turning now to FIG. 4, a perspective plan view of floor 14 is shown. When a battery (not shown for clarity) is inserted, hinge 18 bends while the tip of hook 28 is in sliding contact with groove 8 as shown in FIGS. 1, 3, 3A and 3B. As the battery 4 slides into the capturing mechanism, guide rails 32 engage grooves 8. Guide rails 32 may be straight, or tapered as shown in the figure.

Tapering is preferred so that a loose fit is obtained between rails 32 and groove 8 at the initial engagement of these components. However, as the battery continues to slide into the mechanism, the tapers cause an increasingly snug fit, which guides the electrical connection of the battery precisely into engagement with the connector of the device that is using the capturing mechanism. The snug fit also facilitates solid retention of the battery, thus reducing the likelihood that the battery will wobble or otherwise move within the capturing mechanism, which could result in poor transfer of power from the battery to the device it is powering. It will be appreciated that when installed, a cover (not shown) that forms part of a device enclosure and covers a battery compartment using mechanism 12 may cooperate with leading edge 22 and top surface 30, as shown in FIGS. 2 and 3A-3C, to securing tongue 16 and thus further aid retention of a battery into the capturing mechanism.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

I claim:

1. A mechanism for capturing and interfacing an external component into a cavity in a device housing comprising:
   a floor extending between a receiving end and an interface end of the cavity;
   guide rails defined in the floor;
   a flexible tongue defined in the floor and attached to the floor proximate an interface end, the interface end being at the extent of the cavity proximate a coupling for interfacing the component to the device;

guide tabs defined in the tongue having respective centerlines aligned with the guide rails; and capturing hooks defined in the guide tabs such that when the component is coupled at the interface said hooks positively retain the component into the device.

2. The mechanism of claim 1 wherein the guide rails are tapered such that the thickness of the guide rails is greater near the interface end of the cavity than at the receiving end.

3. The mechanism of claim 1 further comprising a compartment door that covers an opening at the receiving end of the cavity, the door engaging a battery grip thereby assisting the capturing hooks in retaining the battery in mechanism.

4. The door of claim 3 wherein said door is secured to the device housing with a press-fit snap.

5. The mechanism of claim 1 wherein the component is a battery cartridge.

6. A device having a mechanism for capturing and interfacing an external component into a cavity within a housing of the device wherein the mechanism comprises:

a floor extending between a receiving end and an interface end of the cavity;

guide rails defined in the floor;

a flexible tongue defined in the floor and attached to the floor proximate an interface end, the interface end being at the extent of the cavity proximate a coupling for interfacing the component to the device;

guide tabs defined in the tongue having respective centerlines aligned with the guide rails; and capturing hooks defined in the guide tabs such that when the component is coupled at the interface said hooks positively retain the component into the device.

7. The mechanism of claim 6 wherein the guide rails are tapered such that the thickness of the guide rails is greater near the interface end of the cavity than at the receiving end.

8. The mechanism of claim 6 further comprising a compartment door that covers an opening at the receiving end of the cavity, the door engaging a battery grip thereby assisting the capturing hooks in retaining the battery in mechanism.

9. The door of claim 8 wherein said door is secured to the device housing with a press-fit snap.

10. The mechanism of claim 6 wherein the component is a battery cartridge.

\* \* \* \* \*